United States Patent [19]

Baba et al.

[11] Patent Number: 4,777,155
[45] Date of Patent: Oct. 11, 1988

[54] SINTERED MEMBER OF ALUMINUM NITRIDE BASE REINFORCED COMPOSITE MATERIAL

[75] Inventors: Hidetoshi Baba; Hisashi Ito, both of Nagoya, Japan

[73] Assignee: NKG Spark Plug Co., Ltd., Nagoya, Japan

[21] Appl. No.: 906,237

[22] Filed: Sep. 12, 1986

[30] Foreign Application Priority Data

Sep. 30, 1985 [JP] Japan .................. 60-217400

[51] Int. Cl.⁴ ............ C04B 35/56; C04B 35/58; C04B 35/80

[52] U.S. Cl. ............................... 501/87; 501/88; 501/89; 501/92; 501/96; 51/307; 51/308; 51/309

[58] Field of Search ............. 501/87, 88, 89, 92, 501/96; 51/307, 308, 309

[56] References Cited

U.S. PATENT DOCUMENTS

| | | | |
|---|---|---|---|
| 4,539,298 | 9/1985 | Komeya et al. | 501/92 |
| 4,543,345 | 9/1985 | Wei | 501/91 |
| 4,585,500 | 4/1986 | Minjolle et al. | 501/92 |
| 4,591,537 | 5/1986 | Aldinger et al. | 501/96 |
| 4,650,777 | 3/1987 | Kurokawa et al. | 501/96 |

FOREIGN PATENT DOCUMENTS

50-151704  5/1974  Japan.
50-31411   3/1979  Japan.

Primary Examiner—Mark L. Bell
Attorney, Agent, or Firm—Foley & Lardner, Schwartz, Jeffery, Schwaab, Mack, Blumenthal & Evans

[57] ABSTRACT

The disclosure relates to a sintered aluminum nitride base composite material which consists essentially of 5–50 wt % of SiC whiskers, 0.5–10 wt % of sintering assistant(s) selected from $SiO_2$, $Y_2O_3$, CaO, $Al_2O_3$, Mo, W, $Mo_2C$, WC and oxides of elements of the lanthanide series and the balance of AlN. By virtue of dispersion of SiC whiskers in AlN base ceramic matrix the sintered material is very enhanced in strength, toughness and hardness and exhibits increased heat conductivity. The sintered material provides excellent cutting tools since Rockwell superficial hardness, 45N scale, can be made higher than 85.

16 Claims, No Drawings

SINTERED MEMBER OF ALUMINUM NITRIDE BASE REINFORCED COMPOSITE MATERIAL

BACKGROUND OF THE INVENTION

This invention relates to a sintered member formed of an aluminum nitride base composite material, which contains whiskers of silicon carbide as a reinforcing and hardness enhancing ingredient. The sintered member may be a cutting tool.

Aluminum nitride, AlN, possesses good heat conductivity and is highly resistant to heat and thermal shocks and also to corrosion by molten metals. Accordingly, in the field of new ceramics AlN has been attracting increasing attention, like $Si_3N_4$ and SiC, as a principal material of various sintered parts including structural members to be exposed to high temperatures.

In practice, sintering of pure AlN powder encounters problems and difficulties. Therefore, some kinds of sintering assistants have been tested for industrial preparation of AlN ceramics. For example, Japanese patent application primary publication No. 50-151704 (1975) shows a method of mass-producing AlN base sintered members by a hot pressing process using adequate amounts of selected sintering assistants, which are represented by Mo and W, $Mo_2C$ and/or WC, so as not to impair the advantageous properties of AlN. The AlN base sintered members obtained by this method are comparable to conventional alumina base ceramics members in mechanical strength and toughness, but the AlN base ceramics members are lower in hardness than $Al_2O_3$ base ceramics members which are often embodied in cutting tools. The hardness of the AlN base sintered members is about 85 at the maximum, in terms of Rockwell superficial hardness 45N scale. (In the present application hardness values are always in this sense unless otherwise noted.)

To compensate for insufficient hardness of AlN base ceramics, Japanese patent application primary publication No. 54-31411 (1979) proposes an AlN base sintered member which has a hard alumina coating in at least a selected area of the surfaces and can serve as a cutting tool. However, the provision of such alumina coating inevitably leads to lowering of productivity and a considerable increase in the production cost.

SUMMARY OF THE INVENTION

It is an object of the present invention to provide a sintered member of an aluminum nitride base composite material, which retains the favorable properties inherent to AlN and possesses enhanced strength and enhanced hardness and which is fairly high in productivity.

It is another object of the invention to provide a cutting tool which is formed of a sintered composite material according to the invention.

The present invention provides a sintered member formed of a composite material consisting essentially of 5-50% of SiC whiskers, 0.5-10 wt% of at least one sintering assistant ingredient selected from $SiO_2$, $Y_2O_3$, CaO, $Al_2O_3$, Mo, W, $Mo_2C$, WC and oxides of the elements of the lanthanide series, i.e. elements of atomic numbers through 57 to 71, and the balance of AlN.

In the present application the term "SiC whiskers" means, as in the usual sense, whiskery single crystals of SiC which are about 0.1 to 1.5 μm in thickness or diameter.

Tensile strength of SiC whiskers is as high as $10^2$ kg/mm$^2$. In a sintered composite material according to the invention an appropriate amount of SiC whiskers are dispersed in an AlN base ceramic matrix. The incorporation of SiC whiskers in such a manner brings about 20% enhancement of the tensile and flexural strength and 50-100% enhancement of toughness and, besides, makes it practicable to increase the hardness of the sintered material to or above 85. Furthermore, the heat conductivity of the sintered material containing SiC whiskers exhibits some increase. Probably this is because the individual whiskers of SiC in the sintered composite material extend across glass layers, which are produced around the grain boundaries by the addition of the sintering assistant(s) and are relatively low in heat conductivity, so that the AlN particles are thermally connected with one another by the SiC whiskers. Thermal shock resistance is also enhanced as the tensile and flexural strength and heat conductivity are enhanced.

A sintered member of an AlN base composite material according to the invention can be embodied in a high-hardness cutting tool. Besides, this invention can be used for variously different purposes such as, for example, high temperature structural members, heatsinks, heat resistant parts and electrical insulators. When using the invention as a cutting tool, it is desirable to control the composition of the AlN base composite material such that the hardness of the sintered material is not lower than 85.5, though such limitation to the hardness is not an essential matter in this invention.

DESCRIPTION OF THE PREFERRED EMBODIMENTS

SiC whiskers for use in the present invention are commercially available. In the AlN base composite material the content of SiC whiskers is limited within the range from 5 to 50 wt%. If the content of SiC whiskers is less than 5 wt% the above described effects of SiC whiskers are almost inappreciable. On the other hand, if the content of SiC whiskers exceeds 50 wt% it becomes difficult to obtain a sufficiently densely sintered member so that the sintered member becomes lower in mechanical strength.

At least one kind of sintering assistant is always used to promote good sintering of an AlN base composite material, which is in a compacted state, into a sintered body having an apparent density close to the true specific gravity of the composite material. Any one of, and any combination of $SiO_2$, $Y_2O_3$, CaO, $Al_2O_3$, Mo, W, $Mo_2C$, WC and oxides of lanthanide series elements of atomic numbers through 57 to 71 can be used. The total amount of the sintering assistant(s) in the AlN base composite material is limited within the range from 0.5 to 10 wt%. If the amount of this component is less than 0.5 wt% the sintering promoting effect is almost inappreciable. On the other hand, increasing the amount of the sintering assistant(s) beyond 10 wt% will cause significant lowering of the high temperature strength of the sintered composite material and also lowering of the heat conductivity of the same.

A sintered member of an AlN base composite material according to the invention is produced by the steps of preparing a powdery mixture of an AlN powder, SiC whiskers and a powder of a selected sintering assistant or a mixed powder of selected sintering assistant(s), compacting the powdery mixture into a desired shape and sintering the compacted material under pressure. It is suitable to perform pressure sintering of the compacted material either in the manner of gas pressure sintering in a nitrogen gas atmosphere at a pressure of 5-200 atm and at a temperature of 1700°-2000° C. or in the manner of hot pressing in a carbon mold under pressure of 100-300 atm at a temperature of 1600°-1900° C.

EXAMPLES 1-3

The raw material used in these examples were an AlN powder having a mean particle size of about 1.2 μm, SiC whiskers 0.1-1.5 μm in diameter and 10-200 μm in length, a $SiO_2$ powder having a mean particle size of about 0.2 μm and a $Y_2O_3$ powder having a mean particle size of about 1 μm.

In each example the raw materials were mixed in the proportions shown in Table 1, and the mixture was compacted and subjected to hot press sintering in a carbon mold. The sintering was performed at 1750°-1900° C. under pressure of 200 atm.

Representative physical properties of the sintered members produced in these examples were as shown in Table 1. The measurement methods are described hereinafter.

COMPARATIVE EXAMPLES 1-4

Sintered members of aluminum nitride base comosite materials not in accordance with the present invention were produced by using the same raw materials and the same process as in Examples 1-3. As shown in Table 1, in Comparative Examples 1 and 2 the amount of SiC whiskers was too small or too large. In Comparative Examples 3 and 4 the total amount of the sintering assistants was too small or too large. The physical properties of the obtained sintered members were as shown in Table 1.

EXAMPLES 4-6

In these examples, as shown in Table 1, Mo, W or CaO was used as the sintering assistant while the other factors were kept constant. The Mo powder used in Example 4 had a mean particle size of about 0.6 μm. The W powder used in Example 5 had a mean particles of about 0.6 μm. The CaO powder used in Example 6 had a mean particle size of about 0.5 μm. The other raw materials and the manufacturing process were as described in Examples 1-3. The physical properties of the sintered materials are also shown in Table 1.

COMPARATIVE EXAMPLE 5

As can be seen in Table 1, the composition of Example 1 was modified by omitting the addition of SiC whiskers and increasing the amount of the AlN powder to make up for the exclusion of SiC whiskers. The physical properties of the resultant sintered member are also shown in Table 1.

On the sintered AlN base composite materials of Examples 1-6 and Comparative Examples 1-5, the hardness, deflective strength, toughness and heat conductivity were measured by the following test methods.

Measurement of Hardness

Samples of the sintered materials were cut and ground into test pieces of the SNGN 432 shape followed by polishing, and Rockwell superficial hardness, 45N scale, was measured by the method provided in JIS Z 2245. (JIS stands for Japanese Industrial Standard.)

Measurement of Deflective Strength

Test pieces of the sintered materials were subjected to measurement of flexural strength by the three-point method provided in JIS R 1601.

Determination of Toughness

Test pieces of the sintered materials were of the same shape as the ones used in the measurement of hardness. The test pieces were polished to produce a mirror-like surface, and Vickers hardness test was made to determine toughness of each sample by substituting the diagonal width of the indentation into the Niihara's equation.

For the sintered materials of Comparative Examples 2 and 3, it was impossible to determine toughness by this method because these sintered materials were so high in porosity that polishing into a mirror-like surface could not be accomplished.

Measurement of Heat Conductivity

Heat conductivity was measured by the laser flash method provided in JIS C 2141 by using a xenon lamp.

TABLE 1

| | Composition (wt %) | | | Relative Density (%) | Hardness 45 N | Deflective Strength (kg/mm$^2$) | Toughness (MN/m$^{3/2}$) | Heat Conductivity (cal/cm · sec · °C.) |
|---|---|---|---|---|---|---|---|---|
| | SiC whiskers | sintering assistant | AlN | | | | | |
| Comp. Ex. 1 | 4 | $Y_2O_3$ 1, $SiO_2$ 1 | 94 | 99 | 83 | 53 | 4.5 | 0.09 |
| Ex. 1 | 6 | " | 92 | 99 | 86 | 65 | 6.0 | 0.13 |
| Ex. 2 | 45 | " | 53 | 96 | 89 | 66 | 6.3 | 0.15 |
| Comp. Ex. 2 | 55 | " | 43 | 90 | 83 | 35 | — | 0.07 |
| Comp. Ex. 3 | 30 | $Y_2O_3$ 0.2, $SiO_2$ 0.2 | 69.6 | 83 | 81 | 38 | — | 0.06 |
| Ex. 3 | 30 | $Y_2O_3$ 4, $SiO_2$ 4 | 62 | 98 | 88 | 78 | 7.1 | 0.16 |
| Comp. Ex. 4 | 30 | $Y_2O_3$ 6, $SiO_2$ 6 | 58 | 98 | 84 | 65 | 5.1 | 0.08 |
| Ex. 4 | 30 | Mo 2 | 68 | 98 | 90 | 79 | 7.3 | 0.17 |
| Ex. 5 | 30 | W 2 | 68 | 98 | 89 | 75 | 7.4 | 0.18 |
| Ex. 6 | 30 | CaO 2 | 68 | 99 | 88 | 82 | 7.9 | 0.16 |
| Comp. Ex. 5 | 0 | $Y_2O_3$ 1, $SiO_2$ 1 | 98 | 99 | 78 | 51 | 4.0 | 0.09 |

As can be seen in Table 1, the sintered AlN base composite materials produced in Examples 1-6 of the present invention possessed overall better properties than the sintered materials produced as Comparative Examples 1-5.

EXAMPLE 7

The compounding and sintering processes of the foregoing Example 3, Example 6 and Comparative Example 5 were each repeated to produce sintered cutting tools in every case. The three kinds of cutting tools and conventional $Al_2O_3$ base ceramic cutting tools were subjected to a cutting test on a lathe. The test conditiolns were as follows.

Material of Work: gray cast iron FC 20
Cutting Speed: 400 m/min
Depth of Cut: 2 mm
Feed: 0.4 mm/rev.

For each of the sample cutting tools the cutting operation was continued for 20 min unless the cutting tool broke in a shorter time.

The cutting tools in accordance with Examples 3 and 6 all served the purpose for 20 min without breaking. The cutting tools in accordance with Comparative Example 5 broke within 2 min. The $Al_2O_3$ base ceramic cutting tools broke within 1 min.

What is claimed is:

1. A sintered member formed of a composite material consisting essentially of:
   5-50 wt% of SiC whiskers;
   0.5-10 wt% of at least one sintering assistant ingredient which is selected from the group consisting of $SiO_2$, $Y_2O_3$, CaO, $Al_2O_3$, Mo, W, $Mo_2C$, WC and oxides of lanthanide series elements of atomic numbers 57 to 71; and
   the balance of AlN.

2. A sintered member according to claim 1, wherein said SiC whiskers are from about 0.1 μm to about 1.5 μm in diameter.

3. A sintered member according to claim 1, wherein the hardness of the sintered composite material is not lower than 85 in terms of Rockwell superficial hardness 45N scale.

4. A cutting tool formed of a sintered composite material consisting essentially of 5-50 wt% of SiC whiskers, 0.5-10 wt% of at least one sintering assistant ingredient which is selected from the group consisting of $SiO_2$, $Y_2O_3$, CaO, $Al_2O_3$, Mo, W, $Mo_2C$, WC and oxides of lanthanide series elements of atomic numbers through 57 to 71, and the balance of AlN.

5. A cutting tool according to claim 4, wherein the hardness of the sintered composite material is not lower than 85.5 in terms of Rockwell superficial hardness 45N scale.

6. A cutting tool according to claim 5 wherein the heat conductivity is not less than 0.13 cal/cm·sec·°C.

7. A cutting tool according to claim 5 wherein the toughness is not less than $6.0$ $MN/m^{3/2}$.

8. A cutting tool according to claim 5 wherein the deflective strength of the material is not less than 65 $Kg/mm^2$.

9. A cutting tool according to claim 4 wherein the SiC whiskers are single crystals of SiC having a diameter from about 0.1 to 1.5 micrometers.

10. A sintered member according to claim 1 wherein the amount of SiC whiskers is 30 wt%.

11. A sintered member according to claim 1 wherein the at least one sintering assistant is selected from the group consisting of $SiO_2$, $Y_2O_3$, CaO, Mo, and W.

12. A cutting tool formed of a sintered composite material consisting essentially of 5-50 wt.% of SiC whiskers, 0.5-10 wt.% of at least one sintering assistant ingredient which is selected from the group consisting of $SiO_2$, $Y_2O_3$, CaO, $Al_2O_3$, Mo, W, $Mo_2C$, WC and oxides of lanthanide series elements of atomic numbers 57 through 71, and the balance AlN wherein the hardness of the sintered composite material is not lower than 85 in terms of Rockwell superficial hardness 45N scale, the heat conductivity is not less than 0.13 cal/cm·sec·°C., the toughness is not less than $6.0$ $MN/m^{3/2}$, and the deflective strength of the material is not less than 65 $Kg/mm^2$.

13. A sintered member according to claim 1 wherein the hardness of the sintered composite material is not lower than 85 in terms of Rockwell superficial hardness 45N scale, the heat conductivity is not less than 0.13 cal/cm·sec·°C., the toughness is not less than $6.0$ $MN/m^{3/2}$, and the deflective strength of the material is not less than 65 $Kg/mm^2$.

14. A sintered member according to claim 1, wherein at least one of said sintering assistant ingredients consists of $Al_2O_3$.

15. A sintered member according to claim 1, wherein at least one of said sintering assistant ingredients group consists of $Mo_2C$.

16. A sintered member according to claim 1, wherein at least one of said sintering assistant ingredients is selected from the group consisting of oxides of lanthanide series elements of atomic numbers through 57 through 71.

* * * * *